(12) United States Patent
Bucknell et al.

(10) Patent No.: US 9,119,021 B2
(45) Date of Patent: Aug. 25, 2015

(54) RADIO BEARERS FOR MACHINE TYPE COMMUNICATION

(71) Applicant: FUJITSU LIMITED, Kawasaki-shi, Kanagawa (JP)

(72) Inventors: Paul Bucknell, Brighton (GB); Zhaojun Li, Guildford (GB)

(73) Assignee: FUJITSU LIMITED, Kawasaki (JP)

( * ) Notice: Subject to any disclaimer, the term of this patent is extended or adjusted under 35 U.S.C. 154(b) by 239 days.

(21) Appl. No.: 13/765,427

(22) Filed: Feb. 12, 2013

(65) Prior Publication Data

US 2013/0286957 A1 Oct. 31, 2013

Related U.S. Application Data

(63) Continuation of application No. PCT/EP2010/064283, filed on Sep. 27, 2010.

(51) Int. Cl.
*H04W 72/04* (2009.01)
*H04W 4/00* (2009.01)
*H04W 72/12* (2009.01)
*H04W 4/08* (2009.01)
*H04W 74/06* (2009.01)

(52) U.S. Cl.
CPC ............ *H04W 4/005* (2013.01); *H04W 72/121* (2013.01); *H04W 4/08* (2013.01); *H04W 74/06* (2013.01)

(58) Field of Classification Search
None
See application file for complete search history.

(56) References Cited

U.S. PATENT DOCUMENTS

| 2008/0119181 | A1 | 5/2008 | Suzuki et al. | |
|---|---|---|---|---|
| 2011/0268004 | A1* | 11/2011 | Doppler et al. | 370/311 |
| 2011/0268006 | A1* | 11/2011 | Koskela et al. | 370/312 |
| 2011/0310854 | A1* | 12/2011 | Zou et al. | 370/336 |
| 2012/0004003 | A1* | 1/2012 | Shaheen et al. | 455/509 |
| 2012/0030358 | A1* | 2/2012 | MacKenzie | 709/226 |
| 2012/0076085 | A1* | 3/2012 | Chou | 370/329 |

(Continued)

FOREIGN PATENT DOCUMENTS

CN 101814944 A 8/2010

OTHER PUBLICATIONS

Alcatel-Lucent Shanghai Bell, Alcatel-Lucent; "Discussion on key issues in RAN2 for Machine Type Communication (MTC)"; Agenda Item: 4.3.2; 3GPP TSG-WG RAN2 #68-BIS; R2-100287; Valencia, Spain; Jan. 18-22, 2010.

(Continued)

*Primary Examiner* — Duc Duong
(74) *Attorney, Agent, or Firm* — Myers Wolin, LLC

(57) ABSTRACT

A wireless communication method for machine type communication (MTC) where a base station defines a cell for wireless communication of the base station with devices within the cell via a downlink from the base station and via an uplink to the base station using one or more radio bearers; and a plurality of MTC devices are in wireless communication with the base station. The plurality of MTC devices share a radio bearer on at least one of the downlink by taking turns to receive data from the base station according to a predetermined schedule; or the uplink by taking turns to transmit data to the base station according to a predetermined schedule and the base station records each MTC device as a member of a group and assigns to each MTC device a first respective timing based on information which distinguishes the MTC device within the group.

12 Claims, 7 Drawing Sheets

(56) References Cited

U.S. PATENT DOCUMENTS

2012/0106517 A1* 5/2012 Charbit et al. ............... 370/336
2014/0269283 A1* 9/2014 Shaheen ..................... 370/230

OTHER PUBLICATIONS

Alcatel-Lucent Shanghai Bell, Alcatel-Lucent; "Issues of MTC (Machine Type Communication) impact on RAN3"; Agenda Item: 18; 3GPP TSG-RAN WG3 #66bis; R3-100173; Valencia, Spain; Jan. 18-22, 2010.
InterDigital Communication Corporation; "Group based RAB & IP assignment for TS 22.368"; Agenda Item: 8.3, Network Improvements for Machine-type Communications; 3GPP TSG-SA1 #49; S1-100140; San Francisco, USA; Feb. 22-26, 2010.
CATT; "Consideration on Paging for MTC device"; Agenda Item: 4.3.2; 3GPP TSG RAN WG2 Meeting #69; R2-101112; San Francisco, USA; Feb. 22-26, 2010.
ITRI; "Resource sharing solution for MTC Groups"; Agenda Item: 2.1; 3GPP TSG SA WG2 meeting #S2-79E; TD S2-103106; May 6-13, 2010.
China Unicom; "Time Control according to MTC device Identifiers"; Agenda Item: 9.7; 3GPP TSG SA WG2 Meeting #79; TD 52-XXXXXX; Kyoto, Japan; May 10-14, 2010.
LG Electronics Inc.; "Overload control for MTC in GERAN"; Agenda Item: 7.2.5.3.2; 3GPP TSG-GERAN#46; GP-100716; Jeju, South Korea; May 17-21, 2010.
Huawei; "RAN overload control solutions"; Agenda Item: 4.3.2.1; 3GPP TSG-RAN WG2 Meeting #70bis; R2-103967; Stockholm, Sweden; Jun. 28-Jul. 2, 2010.
LG Electronics Inc.; "RRC Connection Release for MTC Devices"; Agenda Item: 4.3.2.3; 3GPP TSG-RAN WG2 #71; R2-104562; Madrid, Spain; Aug. 23-28, 2010.
3GPP TR 23.888 V1.0.0; 3rd Generation Partnership Project; Technical Specification Group Services and System Aspects; "System Improvements for Machine-Type Communications (Release 10)"; Jul. 2010.
International search report issued for corresponding International Patent Application No. PCT/EP2010/064283, mailed Jun. 27, 2011.
Office Action issued for corresponding Chinese Patent Application No. 201080069266.1 issued Apr. 24, 2015 with an English translation.
3GPP TR 23.888 V1.0.0, "3rd Generation Partnership Project; Technical Specification Group Services and System Aspects; System Improvements for Machine-Type Communications; (Release 10)", Jul. 2010.

* cited by examiner

RADIO BEARERS FOR MACHINE TYPE COMMUNICATION

CROSS-REFERENCE TO RELATED APPLICATIONS

This application is based upon PCT Application No. PCT/EP2010/064283, filed Sep. 27, 2010, now pending, the contents of which are wholly incorporated herein.

FIELD OF THE INVENTION

This invention generally relates to a wireless communication system and in particular to Machine Type Communication (MTC) in such a wireless communication system, where MTC is a form of data communication which involves one or more entities that do not necessarily need human interaction.

BACKGROUND OF THE INVENTION

MTC is different from current communication models as it potentially involves very large number of communicating entities (MTC devices) with little traffic per device. Examples of such applications include: fleet management, smart metering, product tracking, home automation, e-health, etc.

MTC has great potential for being carried on wireless communication systems (also referred to here as mobile networks), owing to their ubiquitous coverage. However, for mobile networks to be competitive for mass machine-type applications, it is important to optimise their support for MTC. Current mobile networks are optimally designed for Human-to-Human communications, but are less optimal for machine-to-machine, machine-to-human, or human-to-machine applications. It is also important to enable network operators to offer MTC services at a low cost level, to match the expectations of mass-market machine-type services and applications.

To fully support these service requirements, it is necessary to improve the ability of mobile networks to handle machine-type communications.

Efforts have already been made in this direction, and the 3GPP Technical Report TR 23.888 "System Improvements for Machine-Type Communications", hereby incorporated by reference, summarises an agreed architectural baseline for MTC services provided by a 3GPP wireless communication system.

According to this architectural baseline, the end to end application, between the MTC device and the MTC server, uses services provided by the 3GPP system. The 3GPP system provides transport and communication services (including 3GPP bearer services, IP Multimedia Subsystem or IMS, and Short Messaging Service or SMS) optimized for Machine-Type Communication.

In this architecture, each MTC Device connects to the 3GPP network (UTRAN, eUTRAN, etc.) via an MTCu interface. Each MTC Device communicates with a MTC Server or other MTC Devices using the 3GPP bearer services, SMS and IMS provided by the PLMN (Public Land Mobile Network). The MTC Server is an entity which connects to the 3GPP network via an MTCi interface (for IMS) or a MTCsms interface (for SMS) and thus communicates with MTC Devices. The MTC Server may be an entity outside of the operator domain, or inside an operator domain.

The above-mentioned interfaces are briefly described in the above document as follows:

MTCu: provides MTC Devices access to the 3GPP network for the transport of user plane and control plane traffic. The MTCu interface may be based on the Uu, Um, Ww and LTE-Uu interfaces.

MTCi: the reference point that the MTC Server uses to connect to the 3GPP network and thus communicate with MTC Device via 3GPP bearer services/IMS. MTCi may be based on Gi, Sgi, and Wi interfaces.

MTCsms: the reference point that the MTC Server uses to connect to the 3GPP network and thus communicate with MTC Device via 3GPP SMS.

The present invention relates to resource allocation in such an architecture. Before describing the specific problem addressed by the present invention, as well as its solution, some background explanation will first be given of the kinds of system to which the present invention may be applied.

As the present invention may be applied to various kinds of wireless communication system including UMTS and LTE, both of these types of system will be briefly outlined with reference to FIGS. 1 to 4. However, for the avoidance of doubt, it is noted that the present invention may also be applied to other types of wireless communication system including WiMAX (Worldwide Interoperability for Microwave Access) and GERAN (GSM EDGE Radio Access Network).

FIG. 2 shows the network topology in UMTS. A so-called UTRAN (UMTS Terrestrial Radio Access Network) 6 consists of one or more RNS (Radio Network Subsystem) 4. Each RNS controls the allocation and the release of specific radio resources to establish a connection between a Mobile Station MS 2 (also sometimes called UE (User Equipment)) and the UTRAN 6. The RNS 4 is responsible for the resources and transmission/reception in a group of cells.

In FIG. 2, the RNS 4 consists of a Node b 1, which connects wirelessly to each MS over a Uu interface, and a Radio Network Controller (RNC) 3 which is wirelessly connected to the Node b via a Iub interface. The RNCs are in turn connected through a Iu interface to a Serving GPRS Support Node (SGSN) 7 and a Gateway GPRS Support Node (GGSN) 8 for providing services to the users.

Over the radio interface Uu between the Mobile Station (MS) and the Radio Network System (RNS), user data traffic is transported using the User-Plane (that consists of Packet Data Convergence Protocol (PDCP), Radio Link Control (RLC), Medium Access Control (MAC) and PHYsical (PHY) protocol layers. FIG. 1 shows the relationship between the protocol layers for the UMTS control plane and user plane.

The network topology in LTE is illustrated in FIG. 4. As can be seen, each UE 12 connects over a wireless link via a Uu interface to an eNB 11, and the network of eNBs is referred to as the eUTRAN 10.

Each eNB 11 in turn is connected by a (usually) wired link using an interface called S1 to higher-level or "core network" entities, including a Serving Gateway (S-GW 22), and a Mobility Management Entity (MME 21) for managing the system and sending control signalling to other nodes, particularly eNBs, in the network. In addition, a PDN or Packet Data Network Gateway (P-GW) is present, separately or combined with the S-GW 22, to exchange data packets with any packet data network including the Internet. The core network 20 is called the EPC or Evolved Packet Core.

Over the radio interface Uu between the User Equipment (UE) and the eNodeB, user data traffic is transported using the User-Plane consisting of PDCP, RLC, MAC and PHY protocol layers. FIG. 3 shows the relationship between the protocol layers for LTE control plane and user plane.

The concept of "bearers" is important for achieving quality-of-service (QoS) in a 3GPP-based network. In general, a "bearer" can be thought of as an information transmission path of defined capacity, delay and bit error rate, etc. so as to enable a given service or control function to be provided. Various types or levels of bearer can be established, the radio part being set up using radio resource control or RRC.

FIG. 7 shows an EPS Bearer Service Architecture proposed for LTE. The left side of the Figure represents the eUTRAN 10 with the EPC 20 occupying the middle part of the Figure. At the right-hand side, outside the LTE system as such, there is the Internet 24. The vertical bars represent the main entities in the user plane, from the UE 12 to eNB 11 through to S-GW 22 and P-GW 23, terminating in a peer entity (such as an Internet web server 25) connected to the P-GW 23. To provide an end-to-end service 40 between the UE 12 and Peer Entity 25 (as indicated by the upper horizontal band in the figure), the system sets up "bearers" as shown. An EPS Bearer 41 represents the entire connection within the LTE system; it constitutes a QoS flow for a particular service. The connection continues outside the LTE system via an External Bearer 42.

The EPS Bearer 41 is made up, in turn, of a radio bearer (RB) 51 over the link between the UE 12 and eNB 11, and an S1 Bearer 52 between the eNB 11 and S-GW 22. A further Bearer (S5/S8 Bearer 53) is set up between the S-GW 22 and P-GW 23. Each Bearer can be regarded as a "tunnel" in a given protocol layer for transport of packets, connecting the end points for the duration of a particular service or "session", e.g. voice call or download. Thus, the radio bearer 51 transports the packets of the higher-layer EPS Bearer 41 between the UE 12 and eNB 11, and the S1 Bearer 52 transports the packets of the EPS Bearer 41 between the eNB 11 and S-GW 22. Bearer control through RRC, mentioned previously, includes the setting up of bearers for a particular session so as to ensure sufficient QoS, taking into account the resource situation in the eUTRAN 10 and existing sessions already in progress. It also involves the modification and release of RBs.

Radio Bearers include a Data Radio Bearer (DRB), generally used to carry user data but also sometimes signalling, and a Signalling Data Bearer (SRB) used for signalling. Radio bearers may be bidirectional (that is, defined on both uplink UL and downlink DL) or unidirectional (e.g., downlink only).

Radio Bearers typically remain defined for a relatively extended period of system operation (such as the duration of a voice call by a given UE). As such they persist over many cycles of operation in the system. A wireless communication system generally divides time into a succession of equal-length cycles or "frames". Within each frame, transmission on the uplink and downlink may either occur successively (TDD) or simultaneously (FDD) depending on the system configuration. The length of each frame is related to a Transmission Time Interval (TTI) which is the time duration of one block of data transmitted in the system. Generally, a UE will transmit or receive one block at a time, except in the case of MIMO (Multiple-Input, Multiple-Output) where multiple antennas are employed.

In an LTE wireless communication system, the combination of protocol layers PDCP/RLC/MAC is also known as Layer 2, and the architecture for each of the downlink and uplink are depicted in FIGS. 5 and 6.

In these Figures, Service Access Points (SAP) for peer-to-peer communication are marked with circles at the interface between sublayers. The SAP between the physical layer and the MAC sublayer provides the transport channels. The SAPs between the MAC sublayer and the RLC sublayer provide the logical channels.

The multiplexing of several logical channels, i.e. radio bearers (RBs), on the same transport channel (i.e. transport block) is performed by the MAC sublayer. In both uplink and downlink, only one transport block is generated per TTI in the non-MIMO case.

FIG. 7 represents one possible structure for the PDCP sublayer. Each RB (i.e. DRB and SRB, except for SRB0) is associated with one PDCP entity. Each PDCP entity is associated with one or two (one for each direction) RLC entities depending on the RB characteristic (i.e. unidirectional or bi-directional) and RLC mode. The PDCP entities are located in the PDCP sublayer.

As already mentioned, Machine Type Communication (MTC) is a form of data communication which involves one or more entities that do not necessarily need human interaction. MTC is different to current communication models as it involves new or different market scenarios. Potentially it involves very large number of communicating entities (MTC devices) with little traffic per device. MTC devices may be required to access to the network simultaneously, and uplink traffic may exceed downlink traffic, for example where the MTC devices are required to send reports back to a supervising entity.

A typical UMTS network with MTC devices is shown in FIG. 9. Several MTC devices 100 are connected via radio interface MTCu to a Node b 1 that is controlled by a RNC 3. The user data for the MTC devices 100 is routed to the MTC server (not shown) via SGSN 4 and GGSN 5. Note that the Node b 1 and RNC 3 also serve normal MSs 2 at the same time, via the Uu interface.

Likewise, in the LTE network illustrated in FIG. 10, a group of MTC devices 200 is served by an eNB 11 which also maintains connections with normal UEs 12. The eNB receives signalling from the MME 21 and data (for example, a request for a status report from a supervisor of the MTC devices) via the S-GW 22.

Thus, based on current proposals, the MTCu interface is analogous to the Uu interface, and the MTC devices will be served in a similar way to normal user equipments by the mobile networks. When a large number of MTC devices connect to the same cell of a UMTS RNS or an LTE eNB, each of the devices will have the appropriate radio bearers configured to support the individual devices' applications although to a large extent each MTC device has little traffic.

As an example, we examine the bearer services for the MTC devices in an LTE network. In the MTCu interface, which is similar to the Uu interface mentioned earlier, an EPS bearer is one-to-one mapped to a data radio bearer (DRB), a DRB is one-to-one mapped to a Dedicated Traffic Channel (DTCH) logical channel, and all logical channels are many-to-one mapped to the Downlink or Uplink Shared Transport Channel (DL-SCH or UL-SCH). For each application of a MTC device, a DRB will be allocated, corresponding to the radio bearer 51 in FIG. 7. This involves a certain amount of control signalling for each RB and moreover, the available number of RBs is limited.

Therefore, an important issue is how to efficiently allocate radio resource to support a large number of MTC devices in the same cell while keeping to a minimum the control signalling overhead. Another important aspect is how to keep the minimum impact on other users (not machines) by the large number of machine-type communications.

SUMMARY OF THE INVENTION

The present invention relates to 3GPP Machine Type Communication services as described above.

This invention addresses the problem of radio resource allocation method for a large number of MTC devices with little traffic in the same cell to enable the efficient use of radio access network resources for machine-type communications whilst minimising control signalling overhead. Especially, the present invention relates to radio access network enhancements for Universal Mobile Telecommunications System (UMTS) and the UMTS Long Term Evolution (LTE) to improve the support for machine type communication considering their specific requirements.

According to a first aspect of the present invention, there is provided a wireless communication method for machine type communication, MTC, wherein:

a base station defines a cell for wireless communication of the base station with devices within the cell via a downlink from the base station and via an uplink to the base station using one or more radio bearers; and a plurality of MTC devices are in wireless communication with the base station, wherein the plurality of MTC devices share a radio bearer on at least one of:

the downlink by taking turns to receive data from the base station according to a predetermined schedule; or the uplink by taking turns to transmit data to the base station according to a predetermined schedule; and the base station records each MTC device as a member of a group and assigns to each MTC device said first respective timing based on information which distinguishes the MTC device within the group.

In the above method, transmissions on the uplink preferably take place within a sequence of predetermined time periods, and the base station assigns to each MTC device a first respective timing for its uplink transmission within a said predetermined time period. Where the system divides time into a plurality of equal-length cycles or frames, this timing may occur every cycle/frame, or once per n frames, or may be a single timing determined on an ad-hoc basis.

In other words, "taking turns" by the MTC devices may involve one MTC device at a time transmitting its data via the common RB.

Preferably the base station records each device as a member of a group, and each MTC device is assigned said first respective timing based on identifying information of the MTC device within the group.

In any case, preferably, the MTC devices are only allowed to access the uplink after being paged by the base station.

The predetermined schedule for receiving data may involve each MTC device receiving data at a second respective timing which is derived from said first respective timing.

Also, in the above methods, the base station preferably assigns an index to each MTC device, in which case the first respective timing is derived from a transmission start timing plus an offset based on said index. Such an index may be assigned in order of requests received from the MTC devices.

The MTC devices may share the same radio network identifier, such that the plurality of MTC devices is treated like one user equipment by the base station.

Alternatively, a group of the MTC devices may include devices having (collectively) more than one radio network identifier.

The MTC devices may share the same MTC group identifier. This may identify them to the base station (and the network) as a group to distinguish them from a normal user equipment.

The MTC group identifier may be derived from the (or each) radio network identifier already mentioned. The fields of the radio network identifier may be constructed in such a way as to identify a group identifier and index.

The above identifiers may be combined, for example, as follows:

MTC device ID="a user's radio network identifier (typically C-RNTI)"+"MTC device group identifier"+"MTC device index"

All the MTC devices in a same MTC device group may share the same "a user's radio network identifier" and "MTC device group identifier".

In any case, data transmitted from each MTC device to the base station may be in the form of one or more packets each including information identifying the MTC device.

The base station may maintain group configuration information of the MTC devices so that only updates of the information need be communicated on the uplink to the base station.

According to a second aspect of the present invention, there is provided a wireless communication system for machine type communication, MTC, comprising:

a base station which defines a cell for wireless communication with devices within the cell using on a downlink from the base station and on an uplink to the base station using one or more radio bearers; and a plurality of MTC devices in wireless communication with the base station, wherein the plurality of MTC devices are arranged to share a radio bearer on at least one of:

the downlink by taking turns to receive data from the base station according to a predetermined schedule; or the uplink by taking turns to transmit data to the base station according to a predetermined schedule; and the base station is arranged to record each MTC device as a member of a group and to assign to each MTC device said first respective timing based on information which distinguishes the MTC device within the group.

According to a third aspect of the present invention, there is provided a base station for use in a wireless communication system, the base station comprising:

scheduling means which define a predetermined schedule for a group of MTC devices in wireless communication with the base station such that the plurality of MTC devices share the same radio bearer on at least one of:

the downlink by taking turns to receive data from the base station according to a predetermined schedule; or the uplink by taking turns to transmit data to the base station according to a predetermined schedule; and storage means which record each MTC device as a member of a group and assign to each MTC device said first respective timing based on information which distinguishes the MTC device within the group.

According to a fourth aspect of the present invention, there is provided an MTC device arranged for wireless communication with a base station in successive predetermined time periods and comprising:

transmission means arranged to determine at least one of:

a timing during each said predetermined period at which to receive data on the downlink from the base station according to a predetermined schedule; or a timing during each said predetermined period at which to transmit data on the uplink to the base station according to a predetermined schedule, from a transmission start timing, notified to a group of MTC devices including said MTC device from the base station, and an offset specific to the MTC device.

According to a fifth aspect of the present invention, there is provided one or more non-transitive computer-readable recording media storing software which, when executed by a processor of a base station in a wireless communication system, performs the method as defined above.

BRIEF DESCRIPTION OF THE DRAWINGS

Reference is made, by way of example only, to the accompanying drawings in which.

DETAILED DESCRIPTION

Figure 1:
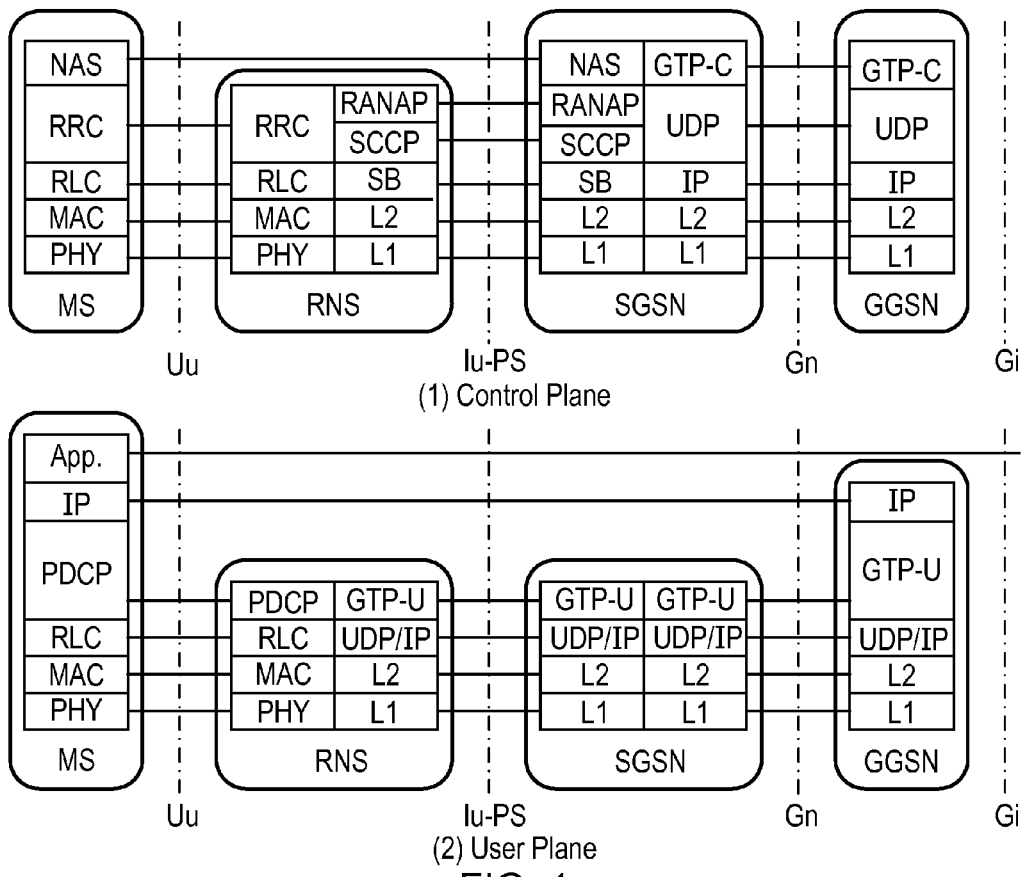
FIG. 1 shows UMTS Control Plane and User Plane Protocol Architecture.
Figure 2:
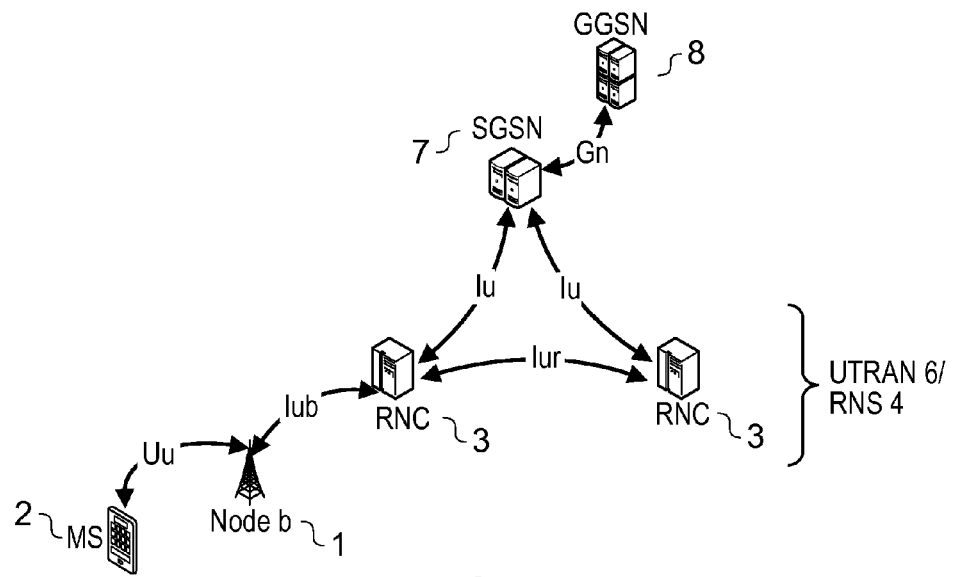
FIG. 2 shows UMTS Network Architecture.
Figure 3:
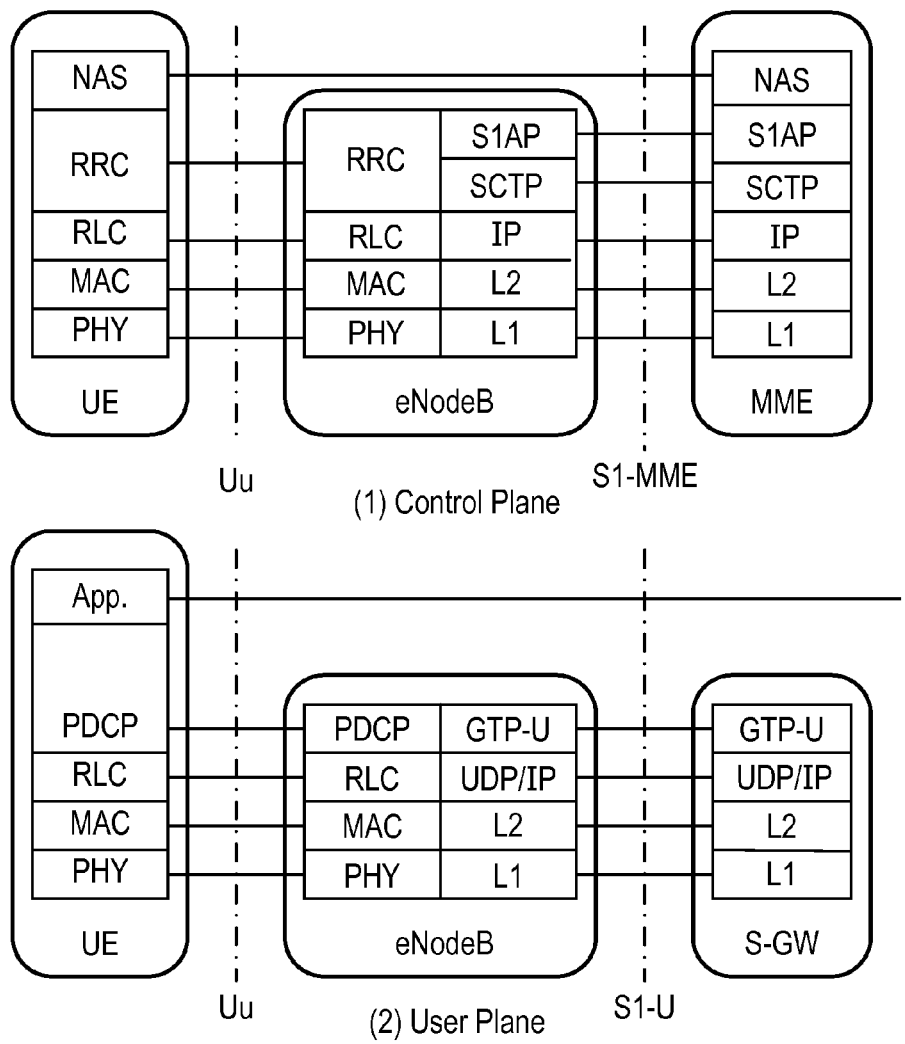
FIG. 3 shows LTE Control Plane and User Plane Protocol Architecture.
Figure 4:
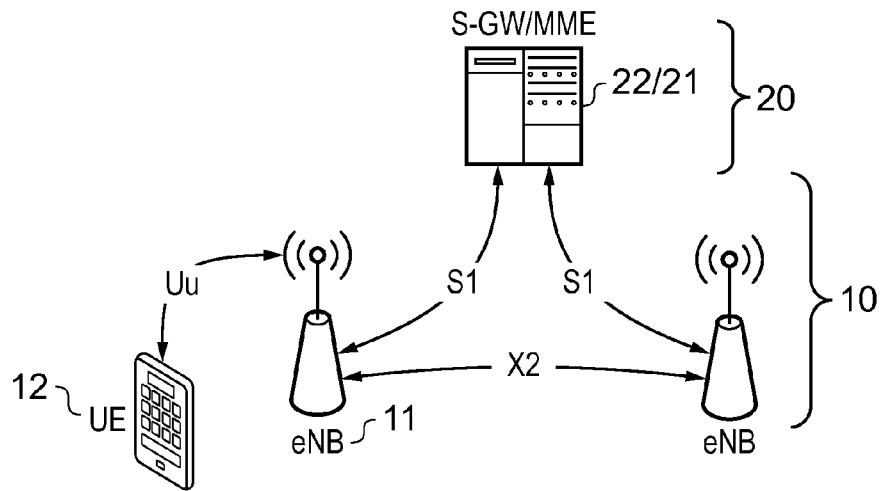
FIG. 4 shows LTE Network Architecture.
Figure 5:
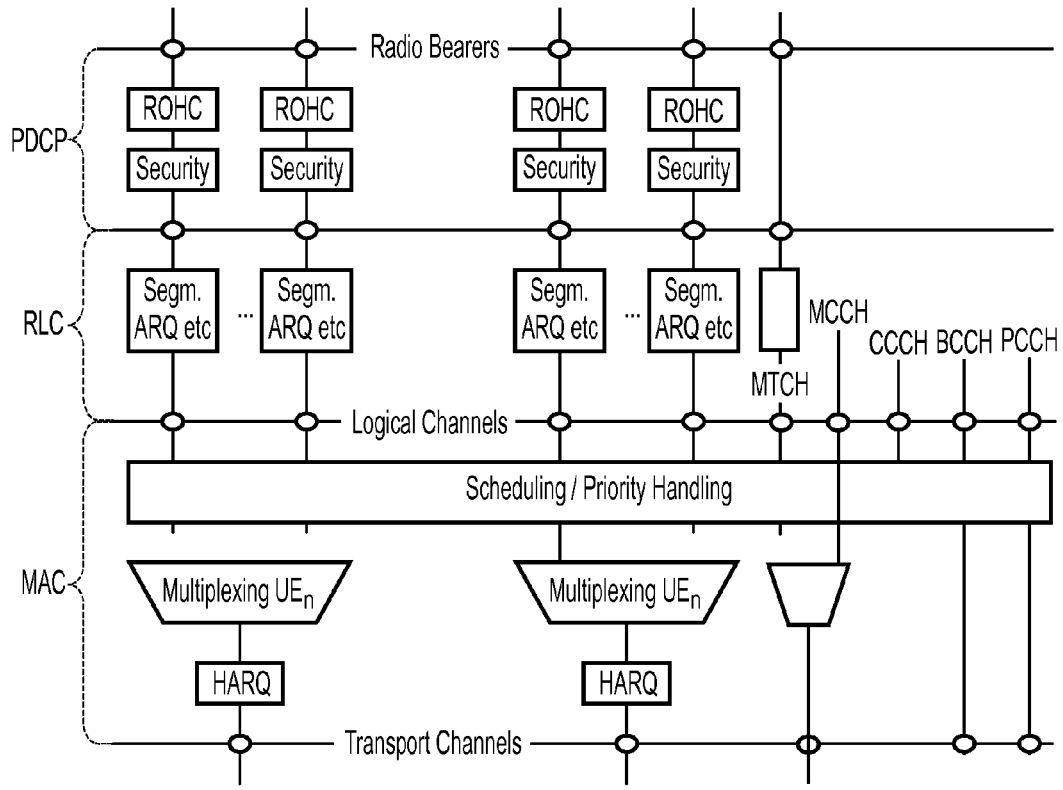
FIG. 5 shows Layer 2 Structure for the downlink (DL) in an LTE system.
Figure 6:
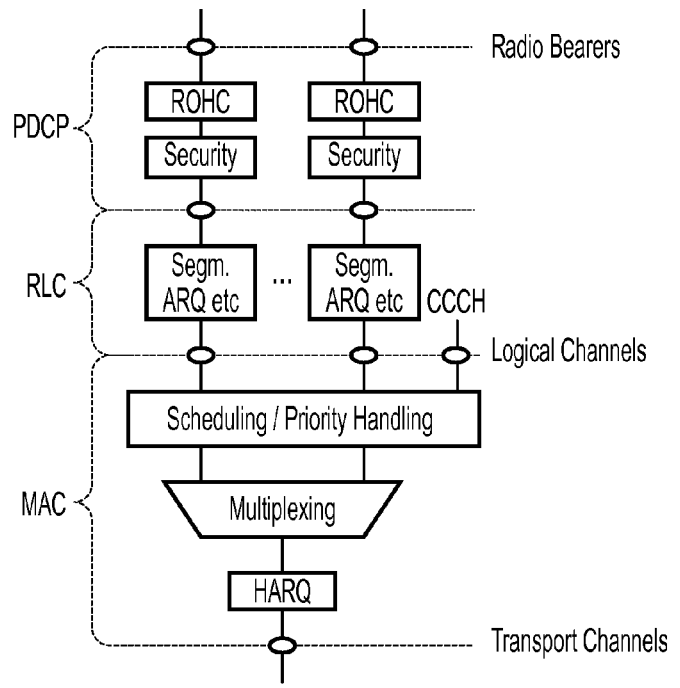
FIG. 6 shows Layer 2 Structure for the uplink (UL) in an LTE system.
Figure 7:
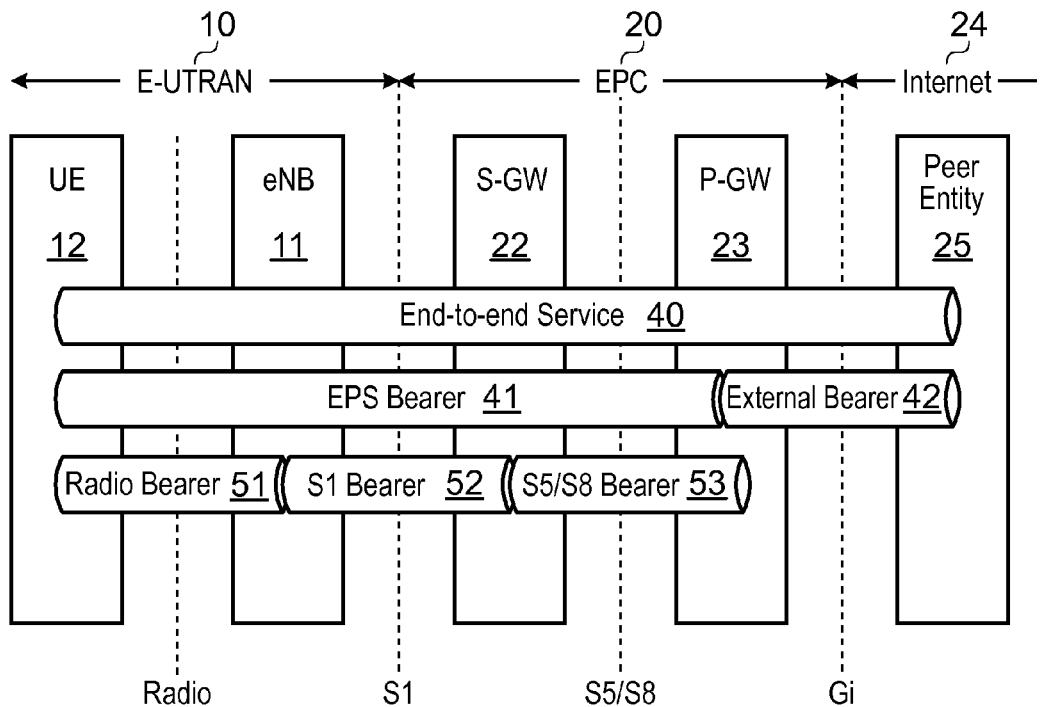
FIG. 7 illustrates bearers, including radio bearers, in an LTE system.
Figure 8:
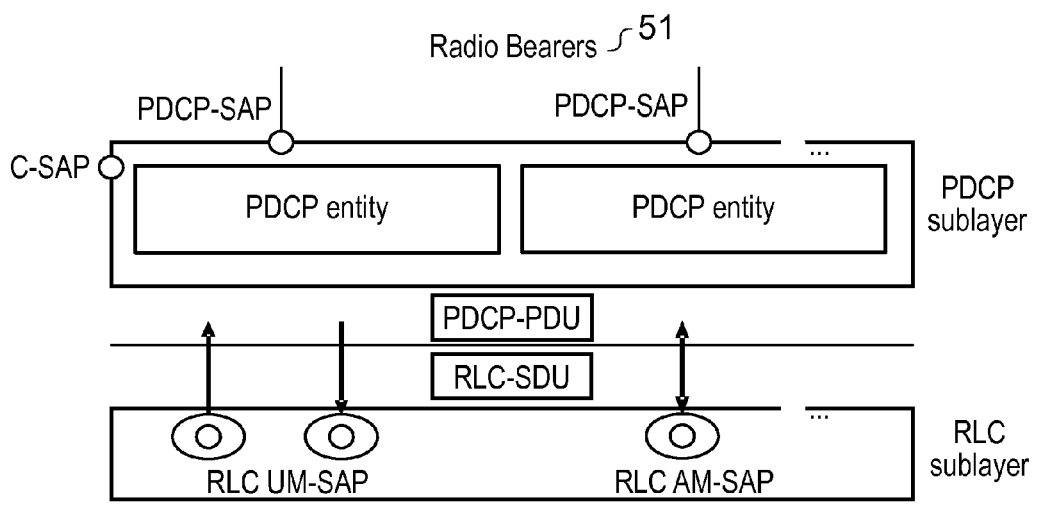
FIG. 8 is a PDCP Layer Structure View.
Figure 9:
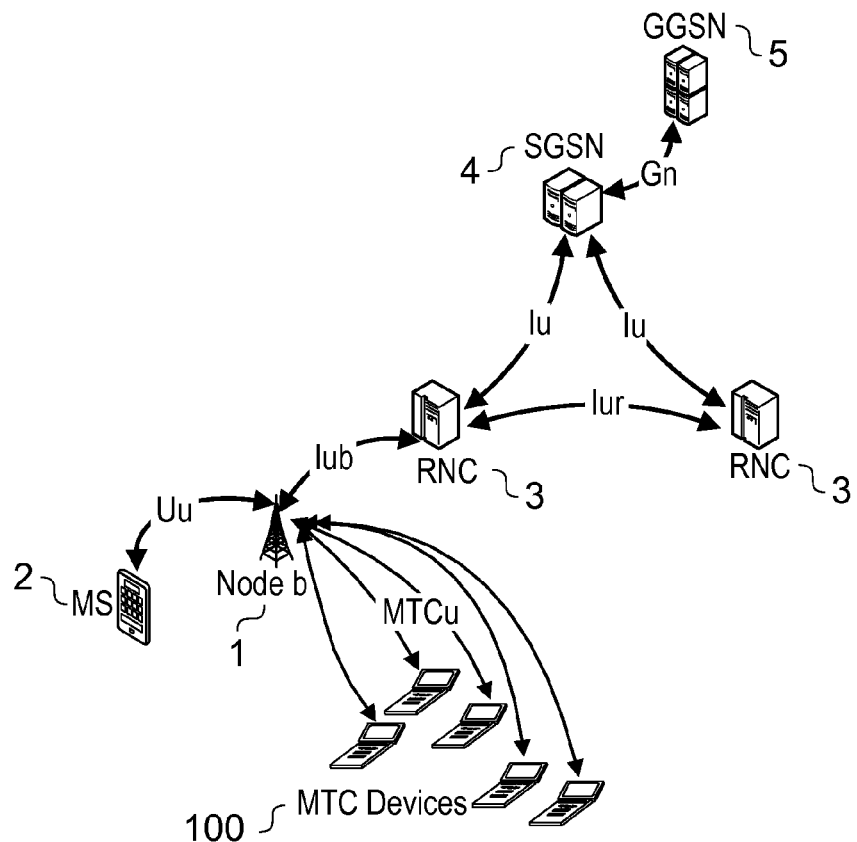
FIG. 9 shows a UMTS Network Architecture with MTC Devices.
Figure 10:
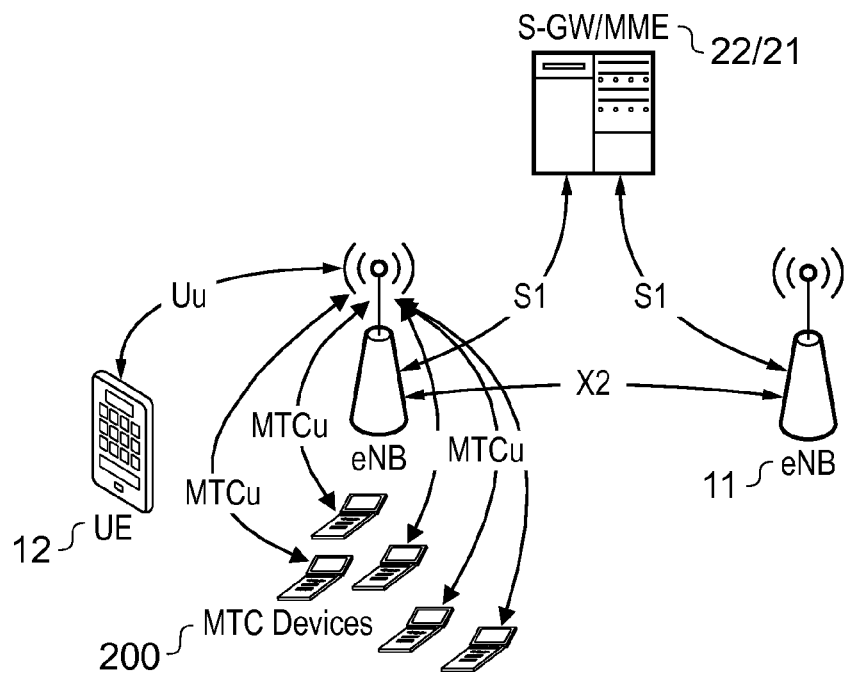
FIG. 10 shows a LTE Network Architecture with MTC Devices.

Embodiments of the present invention involve a radio bearer sharing scheme for machine type communications in both UMTS and LTE networks. A group of MTC devices in the same cell can share the same radio bearer as each of the devices has little traffic. The minimum control signalling overhead can be achieved because this group of MTC devices are treated as one user equipment (an MS in a UMTS network or a UE in an LTE network). Therefore there is little impact on the normal users served in the same cell.

Points addressed by embodiments of the present invention include the following:

How to identify an MTC device on the MTCu interface which is in a group that are connected to a same cell?

How to efficiently allocate radio resource to such a group of MTC devices in the same cell? This group of MTC devices often consists of large number of devices with small traffic.

How to reduce the signalling overhead associated with such large number of small sessions in the same cell?

A method is proposed wherein MTC devices are only allowed to access the network after being paged, and/or at pre-arranged times.

As mentioned, a group of MTC devices served in the same cell is treated as one user equipment. MTC device ID is used to uniquely identify such an MTC device on the MTCu interface in a cell. In one embodiment, all the MTC devices in a group share the same radio network identifier and can be distinguished by a device index. In a variation of this embodiment, all MTC devices in a group additionally share the same MTC group identifier. In a further variation, devices with more than one radio network identifier may share the same MTC group identifier.

For example the MTC device ID may also be derived from the C-RNTI itself, if the C-RNTI is used in such a way that the fields used to construct the C-RNTI are also used to indicate the MTC device group identifier and the MTC device index.

The base station allocates one radio bearer over the MTCu interface (MTCu DRB) for the small sessions of the devices, which have similar QoS requirements (QCI parameter and Layer 2 parameters) and the same MTC server. The data transmission scheduling information is signalled from the base station to the devices in the same group; this can be done without over the air signalling if the timing of the UL signal is linked to a corresponding DL transmission interval. Then the devices transmit data packets one by one accordingly. Here, "one by one" refers to the MTC devices rather than the packets. In other words each MTC device takes turn to transmit its data on the shared RB. The data transmission of each device may comprise one or more packets.

Within the MTCu DRB, the compressed ID is added into the PDCP PDU header to identify the packets belonging to different MTC devices. Only the updates of the information need to be communicated between the MTC devices and the base station in the case that the device members of an MTC group change.

In more detail, assume that a plurality of MTC devices is attached to a cell, in other words in communication with a base station (eNB in LTE) of the cell. The base station recognises this set of devices as a "group" in some way. For example, the MTC devices may each have the ability to recognise themselves as an MTC device, and possibly also such a device which is part of a group, and to signal this to the base station. Alternatively the identification of devices as MTC devices and/or designation of a set of the devices as a group may be handled by some higher-level entity and signalled to the base station. Or the base station may itself determine that some devices attached to it are MTC devices and moreover that a plurality of devices are to be treated as a group, based for example on their geographical location and/or times of attaching to the cell.

In the preferred embodiment, the MTC devices are not allowed to access the network without being paged, or except at a prearranged timing. This allows the use of shared identifiers for the MTC devices as the MTC does not require a unique identity which would typically be used to identify itself to the network with during a RACH procedure.

The identification used to uniquely identify such an MTC device group (device ID) on the MTCu interface for paging purposes can typically be the C-RNTI (cell Radio Network Temporary Identifier, as is conventionally allocated to a user equipment which attaches to a cell). The C-RNTI can be used to collectively address a large number of devices, as some pre-defined mechanism for controlling subsequent MTC to network transmission will be defined.

However, the base station needs to be able to address or distinguish individual devices within the group. Thus, in addition to the shared identifier common to all devices in the group, there is a need for an individual device ID.

The device ID of an MTC device in such an MTC device group can be allocated by the base station (the RNC in UMTS network or the eNB in LTE network) when the device attaches to a cell. For example, the device ID may be a numerical index (1, 2, 3, . . . ) allotted in chronological order of devices joining the group. (Even when a group of MTC devices tries to attach to a cell at the same time, in practice a network entry procedure may be carried out separately for each device such that each device joins the group, from the perspective of the base station, at a slightly different time).

Once the group of devices is known to the base station (which may store group information in an internal memory), it may be assumed that the base station receives a request to interrogate the group of devices. For example, a software application running on an external computer may send such a request to the network through the P-GW and S-GW, which request is routed to the base station. This in turn may trigger the base station to page the MTC device group.

However, most MTC devices do not actually need to access to the network at the exact same time. For instance, the Location Specific Trigger feature which is intended to trigger MTC Devices in a particular area (e.g. to wake up the MTC Device) may require the MTC devices in a particular area to wake up and access the network simultaneously. In such cases, the base station signals the devices in the group the transmission start time and offset of each device. This signalling can be dedicated signalling to the group of devices, so reducing signalling overhead. The devices transmit data packets one by one accordingly. Thus radio network congestion caused by the large amount of MTC devices accessing network simultaneously can be avoided.

The device members of an MTC group may change due to, for example, some devices switching off for power saving, or simply moving out of the cell. Then, only the updates of the information need to be communicated between the MTC devices and the base station, thus ensuring that only the minimum overhead is required in order to schedule the data transmission of the devices of an MTC group on the MTCu interface.

Figure 11:
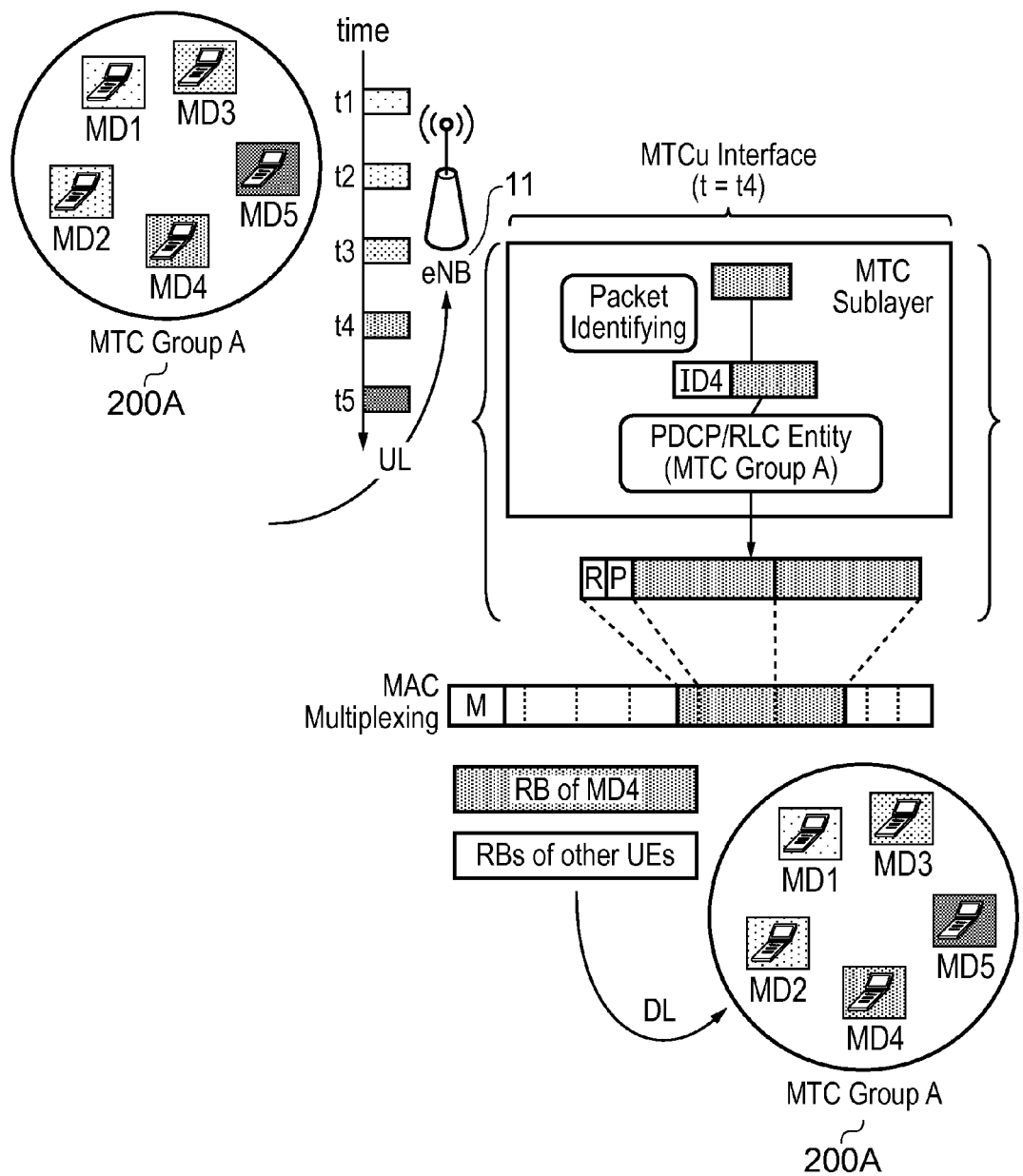
FIG. 11 shows traffic multiplexing and packet identifying over the MTCu interface.

One embodiment of this invention is as shown in FIG. 11. MTC devices MD1, MD2, MD3, MD4 and MD5, belonging to MTC Group 200A, connect to an eNB 11 over radio interface MTCu, which as already mentioned corresponds to the Uu interface between the eNB and UEs.

As already mentioned, in a wireless communication system such as an LTE system, time is divided into successive equal time periods or cycles for transmission of data on the uplink and downlink. These time periods are often called "frames" each having at least one "subframe" for the downlink and uplink respectively. Thus, scheduling of data transmission from an MTC device involves defining an instant of time (or time slot) within an uplink subframe at which each device may send its data. Assuming a TDD system by way of example, part of the downlink subframe is occupied with signalling from the base station to schedule users' uplink data transmissions during the next uplink subframe.

In order to deliver the data packets from multiple devices, the eNB 11 schedules the initial data transmission as follows:

Assuming data transmission for the MTC Group A begins at $t_0$, transmission time for device MD1 $t_1 = t_0 + Offset_{MD1}$;
transmission time for device MD2 $t_2 = t_0 + Offset_{MD2}$;
transmission time for device MD3 $t_3 = t_0 + Offset_{MD3}$;
transmission time for device MD4 $t_4 = t_0 + Offset_{MD4}$;
transmission time for device MD5 $t_5 = t_0 + Offset_{MD5}$.

Other mechanisms for the transmission scheduling of MTC group packets may also be used. For example, instead of offset based on device index, a property such as absolute time (e.g., hh:mm:ss) or location may be used to distinguish one device from another and allow respective timings to be assigned.

The scheduling information may be transmitted to the MTC devices either explicitly (e.g. as $t_1$, $t_2$ etc.—the actual time relative to the start of the frame) or implicitly (e.g. as the Offset$_{MD1}$ etc., or simply by informing each MTC device of its index). In the latter case, each MTC device may need to determine (by calculation or use of a look-up table) the actual transmission slot available to it. Once the scheduling is in place, it may be continued for successive frames if needed (for instance if there is more data than can be transmitted in a single frame, or if there is a need for continuous reports from the devices). Alternatively it may be a once-only schedule, or a schedule to be repeated once per n frames until further notice.

The above procedure relates to data transmitted on the uplink UL from the MTC devices to the eNB 11. However, the same principle can be applied also on the downlink DL, to reduce the number of radio bearers that would otherwise be required.

This also allows a MTC device to power down during downlink slots for which it is not required to be active.

Thus, in the eNB 11 the response for the device MD4 is sent using a shared RB. This shared RB can also contain information for the other MTC devices under this cell. The use of a shared RB also on the uplink will dramatically reduce the amount of transmissions of data to the MTC devices.

In this scheme, it is the offset in the timing that is used to identify the UL transmission for the MTC device and this automatically defines the mapping of the placement in time of the response from the eNB to the device in the shared RB. This avoids the need for additional DL control signalling to identify the placement of the DL data in the transmission to the MTC device. The relationship between the timing of the UL transmission and the placement of DL data in the shared RB can be pre-defined a priori in the standards or by RRC signalling in the setup procedure for the shared RB.

Figure 12:
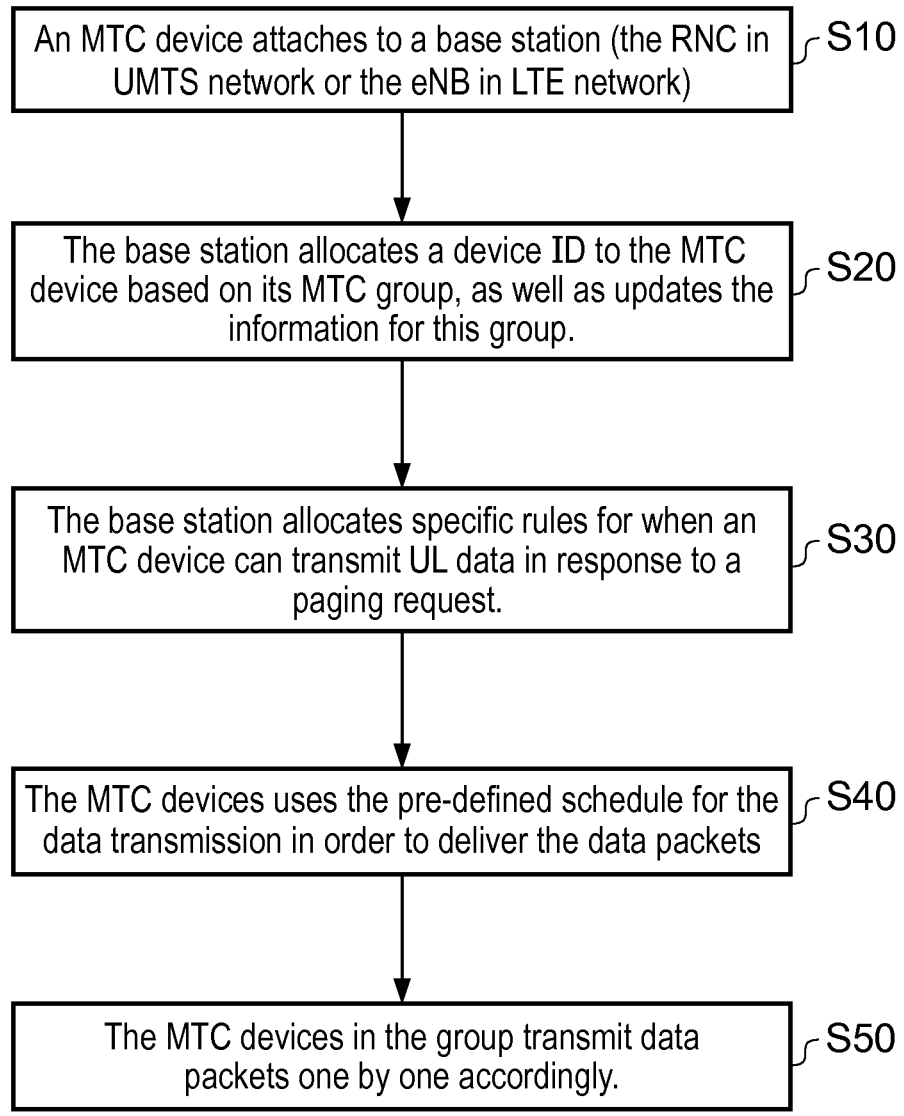
FIG. 12 is a flowchart of a method embodying the present invention.

The procedure for this radio bearer sharing scheme on the MTCu interface for MTC devices in a the same MTC group is shown in the flowchart of FIG. 12, as follows:

S10. An MTC device, which belongs to an MTC group, attaches to a base station.

S20. The base station (the RNC in UMTS network or the eNB in LTE network) allocates the MTC device ID to uniquely identify such an MTC device on the MTCu interface in a cell, possibly using dedicated control layer signalling.

In one possible identifier scheme, this ID is the combination of: 1) a user's radio network identifier; 2) the MTC device group identifier; and 3) the device index in such an MTC device group. All the MTC devices in a group may share the same radio network identifier and the MTC group identifier, and can be distinguished by the device index in the group. This has the advantage that the existing radio network identifier space need not be increased.

As mentioned earlier, however, it is also possible for devices having different radio network identifiers to form a group.

In another possible identifier scheme, as already mentioned the MTC device ID may also be derived from the C-RNTI itself, if the C-RNTI is used in such a way that the fields used to construct the C-RNTI are also used to indicate the MTC device group identifier and the MTC device index.

S30. The base station signals, to the devices in the group, the transmission start time and offset of each device.

S40. When the MTC devices in the group request are paged by the network (simultaneously, in most cases), the base station sends a paging signal to the MTC group identifier. The MTC devices use the pre-defined schedule for their transmissions to the base station.

S50. The devices transmit data packets one by one accordingly, and/or with different pre-defined radio resource allocations and can be distinguished by the device index in the group.

In the case that the device members of an MTC group change, only the updates of the group membership information need to be communicated between the MTC devices and the base station, thus ensuring that only the minimum overhead is required in order to schedule the data transmission of the devices of an MTC group on the MTCu interface.

Likewise, on the downlink, transmissions to MTC devices take place using a shared RB where the placement in time of the initial transmission of the request/data from the MTC device defines the placement in time of the data transmitted from the eNB to the device in a shared RB.

To summarise, this invention proposes an identity sharing scheme for machine type communications, especially for a group of MTC devices with small traffic in the same cell. In this scheme, a group of MTC devices served in the same cell is treated as one user equipment, more precisely an MS in a UMTS network or a UE in an LTE network. MTC device ID is used to uniquely identify such an MTC device on the MTCu interface in a cell. All the MTC devices in a group share the same radio network identifier and the MTC group identifier, and can be distinguished by the device index in the group.

When the MTC devices in the group request to access the network (simultaneously, in most cases), the base station allocates one radio bearer over the MTCu interface for the small sessions of the devices, which have the similar QoS requirements (QCI parameter and Layer 2 parameters) and the same MTC server. The transmission start time and offset of each device are signalled from the base station to the devices in the same group. Then the devices take turns to transmit data packets accordingly. Within the MTCu DRB, the ID is added into the PDCP PDU header to identify the packets belonging to different MTC devices. Thus radio network congestion caused by the large amount of MTC devices accessing network simultaneously can be avoided.

DL transmissions to MTC devices may likewise take place using a shared RB, where the placement in time of the initial transmission of the request from the MTC device defines the placement in time of the data transmitted from the eNB to the device in a shared RB.

Furthermore, in the case that the device members of an MTC group change, only the updates of the information need to be communicated between the MTC devices and the base station, thus ensuring that only the minimum overhead is required in order to schedule the data transmission of the devices of an MTC group on MTCu interface.

Various modifications are possible within the scope of the present invention.

In the above description, reference was made to a base station allocating one RB for the whole group of MTC devices. Depending on the size of the group and the application, however, the amounts of data involved (particularly on the uplink) may exceed the capacity of one RB. In a variation of the above embodiment, the base station detects an excess of data needing to be transmitted (as compared with a pre-configured limit known to the base station) and if necessary allocates a second (or third, etc.) RB to the group. This may result in different numbers of RBs being defined on the uplink and downlink. However, the result is still a great decrease in the amount of signalling compared to the case if each MTC device were allocated its own RB.

In the above description, it was stated that the MTC devices transmit (or receive) data one by one at predetermined timings. This may mean that each device is given one opportunity to transmit (or receive) in each frame. Alternatively, the same device may be allocated two (or more) distinct timings within the same frame. For example (particularly if the number of devices in the group is small), transmission opportunities for each of the MTC devices in turn may be repeated up to the total number of available time slots. On the other hand it may be that one frame is insufficient to grant one transmission opportunity to every device in a large group, in which case the allocation of timings to the individual members would be extended over more than one frame.

Whilst it is particularly efficient and convenient to schedule downlink transmissions to MTC devices such that the placement in time of the initial transmission of the request from the MTC device defines the placement in time of the data transmitted from the eNB to the device in a shared RB, this is not essential and there is no need to link DL and UL in this way.

The above description has used LTE as an example, employing the term eNB for a base station of such a system. Various forms of base station type device are possible in a wireless communication system (for example, a Home eNodeB in LTE) as well as relay stations, and the term "base station" is intended to cover all such possibilities.

INDUSTRIAL APPLICABILITY

A radio bearer sharing scheme embodying the present invention enables efficient use of radio access network resources for machine-type communications (MTC).

Based on this scheduling scheme, over the MTCu interface, the MTC devices transmit data packets one by one accordingly when they are required to access to the network simultaneously. Thus radio network congestion caused by the large amount of MTC devices accessing the network simultaneously can be avoided.

Only the updates of the information, rather than details of all group members, need to be communicated between the MTC devices and the base station in the case that the device members of an MTC group change. This ensures that only the minimum overhead is required in order to schedule the data transmission of the devices of an MTC group on the MTCu interface.

Downlink data transmission timing can be derived from uplink access timing thus avoiding the need for unnecessary downlink control signalling.

Another important benefit is that the scheduling scheme minimises the impact on the radio access network performance that is caused by the large number of machine-type communications.

The invention claimed is:

1. A wireless communication method for machine type communication, MTC, the method comprising:
defining by a base station a cell for wireless communication of the base station with devices within the cell via a downlink from the base station and via an uplink to the base station using one or more radio bearers; and
performing wireless communication of the base station with a plurality of MTC devices by:
sharing a radio bearer by the plurality of MTC devices on the downlink by taking turns to receive data from the base station according to a predetermined schedule and on the uplink by taking turns to transmit data to the base station according to a predetermined schedule;
the base station recording each MTC device as a member of a group and assigning to each MTC device a first respective timing within a predetermined time period for the MTC device to transmit data on the uplink based on information which distinguishes the MTC device within the group, and a second respective timing for the MTC device to receive data from the base station, the second respective timing derived from said first respective timing.

2. The method according to claim 1 further comprising:
allowing the MTC devices to access the uplink only after being paged by the base station.

3. The method according to claim 1 further comprising:
the base station maintaining group configuration information of the MTC devices so that only updates of the information need be communicated on the uplink to the base station.

4. A wireless communication system for machine type communication, MTC, comprising:
a base station configured to define a cell for wireless communication with devices within the cell using on a downlink from the base station and on an uplink to the base station using one or more radio bearers; and
a plurality of MTC devices configured for wireless communication with the base station, wherein:
the plurality of MTC devices are arranged to share the same radio bearer on the downlink by taking turns to receive data from the base station according to a predetermined schedule, and on the uplink by taking turns to transmit data to the base station according to a predetermined schedule; and
the base station is arranged to record each MTC device as a member of a group and is arranged to assign to each MTC device a first respective timing within a predetermined time period for the MTC device to transmit data on the uplink based on information which distinguishes the MTC device within the group, and a second respective timing for the MTC device to receive data from the base station, the second respective timing derived from said first respective timing.

5. A base station for use in a wireless communication system including a plurality of MTC devices, wherein:
the base station is configured to define a cell for wireless communication with devices within the cell using on a downlink from the base station and on an uplink to the base station using one or more radio bearers, and to define a predetermined schedule for a group of MTC devices such that the MTC devices share the same radio bearer on the downlink by taking turns to receive data from the base station according to the predetermined schedule, and share the same radio bearer on the uplink by taking turns to transmit data to the base station according to the predetermined schedule; and
the base station is arranged to record each MTC device as a member of a group and is arranged to assign to each MTC device a first respective timing within a predetermined time period for the MTC device to transmit data on the uplink based on information which distinguishes the MTC device within the group, and a second respective timing for the MTC device to receive data from the base station, the second respective timing derived from said first respective timing.

6. A wireless communication method for machine type communication, MTC, the method comprising:
defining by a base station a cell for wireless communication of the base station with devices within the cell via a downlink from the base station and via an uplink to the base station using one or more radio bearers; and
performing wireless communication of the base station with a plurality of MTC devices by:
sharing a radio bearer by the plurality of MTC devices at least on the uplink by taking turns to transmit data to the base station according to a predetermined schedule; and
the base station recording each MTC device as a member of a group, assigning an index to each MTC device, and assigning to each MTC device a first respective timing for transmissions on the uplink within a predetermined time period, the first respective timing derived from a transmission start timing plus an offset based on said index.

7. The method according to claim 6 further comprising:
allowing the MTC devices to access the uplink only after being paged by the base station.

8. The method according to claim 6 further comprising:
the plurality of MTC devices sharing a radio bearer on the downlink by each MTC device receiving data at a second respective timing which is derived from said first respective timing.

9. The method according to claim 6 further comprising:
the base station assigning each index in order of requests received from the MTC devices.

10. The method according to claim 6 further comprising:
the base station maintaining group configuration information of the MTC devices so that only updates of the information need be communicated on the uplink to the base station.

11. A wireless communication system for machine type communication, MTC, comprising:
a base station configured to define a cell for wireless communication with devices within the cell using on a downlink from the base station and on an uplink to the base station using one or more radio bearers; and
a plurality of MTC devices configured for wireless communication with the base station, wherein:
the plurality of MTC devices are arranged to share the same radio bearer at least on the uplink by taking turns to transmit data to the base station according to a predetermined schedule; and
the base station is arranged to record each MTC device as a member of a group, to assign an index to each MTC device, and assign to each MTC device a first respective timing for transmissions on the uplink within a predetermined time period, the first respective timing derived from a transmission start timing plus an offset based on said index.

12. A base station for use in a wireless communication system including a plurality of MTC devices, wherein:
the base station is configured to define a cell for wireless communication with devices within the cell using on a downlink from the base station and on an uplink to the base station using one or more radio bearers, and to define a predetermined schedule for a group of MTC devices such that the MTC devices share the same radio bearer at least on the uplink by taking turns to transmit data to the base station according to the predetermined schedule; and
the base station is arranged to record each MTC device as a member of a group, to assign an index to each MTC device, and assign to each MTC device a first respective timing for transmissions on the uplink within a predetermined time period, the first respective timing derived from a transmission start timing plus an offset based on said index.

* * * * *